(12) United States Patent
Piccin et al.

(10) Patent No.: US 9,352,704 B2
(45) Date of Patent: May 31, 2016

(54) LINING ELEMENT HAVING A VISIBLE FACE PARTLY FORMED WITH A LIGNEOUS MATERIAL

(71) Applicant: Faurecia Interieur Industrie, Nanterre (FR)

(72) Inventors: Hugo Piccin, Munich (DE); Nathalie Durand, Amberieu en Bugey (FR)

(73) Assignee: Faurecia Interieur Industrie, Nanterre (FR)

( * ) Notice: Subject to any disclaimer, the term of this patent is extended or adjusted under 35 U.S.C. 154(b) by 53 days.

(21) Appl. No.: 13/918,168

(22) Filed: Jun. 14, 2013

(65) Prior Publication Data

US 2014/0004289 A1    Jan. 2, 2014

(30) Foreign Application Priority Data

Jun. 14, 2012 (FR) ...................... 12 55558

(51) Int. Cl.
*B60R 13/02*  (2006.01)
*B27D 1/10*  (2006.01)
*B27M 3/00*  (2006.01)

(52) U.S. Cl.
CPC . *B60R 13/02* (2013.01); *B27D 1/10* (2013.01); *B27M 3/0073* (2013.01); *Y10T 428/19* (2015.01)

(58) Field of Classification Search
CPC . Y10T 428/192; Y10T 428/197; B60R 13/02; B60R 2013/0281; B29L 2031/3014; B29L 2031/3041
USPC .................................................. 428/57, 61
See application file for complete search history.

(56) References Cited

U.S. PATENT DOCUMENTS

| | | | |
|---|---|---|---|
| 3,671,984 A | | 6/1972 | Ambrose |
| 4,973,507 A | * | 11/1990 | Horian .......................... 428/102 |
| 2009/0127738 A1 | * | 5/2009 | Smith et al. ................... 264/254 |
| 2011/0133441 A1 | * | 6/2011 | Kaufman ........................ 281/29 |

FOREIGN PATENT DOCUMENTS

| | | |
|---|---|---|
| DE | 29808139 U1 | 8/1998 |
| EP | 1816018 A1 | 8/2007 |

OTHER PUBLICATIONS

Search Report for French application No. FR 12 55558, dated Nov. 15, 2012, 3 pages.

* cited by examiner

*Primary Examiner* — Alexander Thomas
(74) *Attorney, Agent, or Firm* — Reising Ethington P.C.

(57) ABSTRACT

A lining element includes at least one decorative layer formed from at least one complex that includes both a ligneous material layer having a backside and a front side and a reinforcement layer extending over the backside of the ligneous material layer. The decorative layer further includes at least one additional layer made in a material different from the ligneous material. The front side of the additional layer substantially extends in the continuity of the front side of the complex. The additional layer and the complex are attached to each other through at least one seam.

10 Claims, 1 Drawing Sheet

LINING ELEMENT HAVING A VISIBLE FACE PARTLY FORMED WITH A LIGNEOUS MATERIAL

TECHNICAL FIELD

The present invention relates to a lining element of the type comprising at least one decorative layer comprising at least one complex formed with a layer of ligneous material, comprising a front side and backside, and a reinforcement layer extending over the backside of the layer of ligneous material.

BACKGROUND

In order to improve the aspect of lining elements, such as door panels or vehicle dashboard coatings or other elements, it may be desired to produce a decorative layer, the external face of which, visible from the outside of the lining element, is made in two different materials, one of which is a ligneous material, such as wood. Thus, it may for example be desired to associate a wood layer with a skin in leather or another material for producing the trim of high-end vehicles.

However, the use of a wooden layer is very restrictive because of its low malleability and it is difficult to attach it with a layer on another material while ensuring a smooth transition between the wooden layer and the layer of the other material. Further, it is necessary that this attachment between the wooden layer and the layer of the other material does not cause degradation of the wood, for example by generating cracks or splinters in the wooden layer.

In order to achieve attachment of the wooden layer and of the layer in another material, the simplest solution is to stick these layers together. However the use of an adhesive does not give entire satisfaction. Indeed, the materials forming the adhesive may be polluting materials. Further, the weight of the obtained lining element is increased because of the presence of adhesive which has to be positioned over the whole junction area between the wooden layer and the other layer in order to ensure proper attachment of these layers. The use of adhesive may further cause visible defects at the junction between the layers if the latter are poorly aligned or move during the adhesive bonding operation or if the adhesive is apparent between both layers.

SUMMARY

One of the objects of the invention is to overcome these drawbacks by proposing a lining element, the decorative layer of which is formed with two materials, one of which is a ligneous material, and in which the assembling of both materials is accomplished in a simple way by preserving the integrity of the ligneous material layer and ensuring a smooth junction between the layers without using any adhesive.

For this purpose, the invention relates to a lining element of the aforementioned type, in which the decorative layer further comprises at least one additional layer made in a material different from the ligneous material, the front face of the additional layer substantially extending in the continuity of the front face of the complex, said additional layer and said complex being attached to each other through at least one seam.

The use of a complex comprising the ligneous material layer and of a reinforcement layer gives the possibility of making the ligneous material layer thinner and more flexible, thus making it suitable for being sewn without damaging the ligneous material, while this was not possible with ligneous material layers of the prior art. By sewing the layers together, it is possible to ensure attachment of the layers which does not weigh down the lining element, does not use any polluting material and allows an improvement in the aesthetics of the lining element, either by making the seam invisible or by using this seam as a visible seam.

According to other features of the lining element according to embodiments of the invention:
- the seam crosses the whole of the complex and notably at the ligneous material layer;
- the seam substantially extends either substantially parallel or substantially perpendicular to the decorative layer;
- the lining element further comprises at least one supporting layer, said layer extending on the backside of the decorative layer;
- the seam attaching the additional layer and the complex extends on the backside of the decorative layer and is coated with the supporting layer;
- the supporting layer is formed by a composite material comprising natural fibers embedded in a plastic material;
- the lining element further comprises a foam layer extending on the backside of the decorative layer;
- the foam layer extends on the back of the supporting layer;
- the additional layer comprises an area for attaching the decorative layer in a tool for manufacturing the lining element, said attachment area being positioned at a distance from the complex; and
- the additional layer is made of leather or of a leather substitute, a textile material, a plastic material or forms a complex of different layers of such materials.

BRIEF DESCRIPTION OF THE DRAWINGS

Other aspects and advantages of the invention will become apparent upon reading the description which follows, given as an example and made with reference to the appended drawings, wherein.

DETAILED DESCRIPTION

In the description, the terms of "internal" and "external" are defined relatively to the orientation of the lining element when it is positioned in a vehicle, the term of "internal" designating what is intended to be turned towards the body of the vehicle and not visible to the occupants of the vehicle and the term of "external" designating what is intended to be towards the inside of the passenger compartment of the vehicle. The term of "front side" designates the side of an element turned outwards and the term of "backside" designates the side of an element turned towards the inside.

Figure 1:
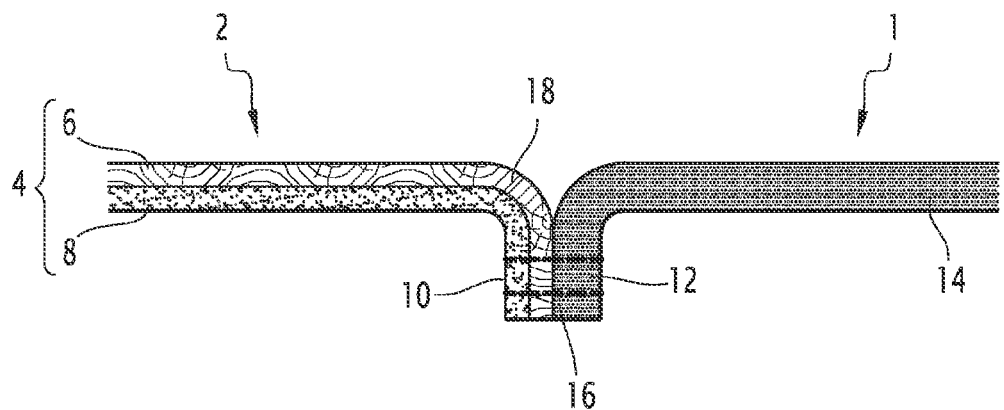
FIG. 1 is a schematic sectional illustration of a portion of a decorative layer of a lining element according to the invention.

With reference to FIG. 1, a decorative layer 1 of a lining element 2 is described, comprising at least two layers formed with different materials and intended to form the external face of the lining element 2, so as to obtain a lining element 2 having at least two different aspects.

One of the two layers is formed by a complex 4, comprising at least, from the outside to the inside, one layer of ligneous material 6 and one reinforcement layer 8.

The ligneous material layer 6 is for example formed by a natural wood layer or by a superposition of wooden layers. The ligneous material layer 6 is sufficiently thin for having some flexibility and thus being able to be shaped in three dimensions. The ligneous material layer 6 for example has a thickness substantially comprised between 0.1 mm and 0.8 mm.

The reinforcement layer 8 directly extends over the backside of the ligneous material layer 6 and is formed by a flexible material. By flexible is meant that the reinforcement layer 8 is not rigid and may be shaped.

The material of the reinforcement layer is for example a textile, such as a woven or non-woven material or paper or cardboard or else further a plastic film.

The ligneous material layer 6 and the reinforcement layer 8 are assembled together, for example by adhesive bonding, and thus form a flexible complex 4 which may be shaped so as to form one portion of a lining element. The total thickness of the complex 4 is for example comprised between 0.5 mm and 3 mm.

The thinness of the complex 4 and in particular that of the ligneous material 6 allow needles to cross the complex without damaging the ligneous material layer 6, i.e. without generating any cracks or splinters around perforations generated by a needle crossing the complex 4. It is therefore understood that the complex 4 may be sewn with another element without being degraded. It will be noted that before being sewn, the complex 4 may optionally be subject to a flexibilization treatment in order to further improve its capabilities of not being degraded during sewing. Such a flexibilization treatment is for example a heat treatment or a treatment with microwaves with which the ligneous material layer 6 may be made more flexible.

According to an embodiment not shown, the complex 4 further comprises a coating layer, for example a varnish, covering the front face of the ligneous material layer 6. The coating layer is laid out for protecting the ligneous material layer 6, notably against ultraviolet radiations which may cause accelerated ageing of the ligneous material layer 6. The coating layer is further laid out so as to let the ligneous material layer 6 be visible from the outside of the lining element while being translucent or transparent. The coating layer therefore forms the front side of the complex 4 and it may further be used for modifying the aspect of the lining element, for example by being colored. The coating is also laid out so as not to be degraded during sewing.

The shape of the complex 4, which may be obtained by cutting out the latter, is of any shape and selected according to the use of the lining element and to the space which the complex 4 occupies in the visible face of this element. At least one portion of its periphery 10 is sewn to at least one portion of the periphery 12 of an additional layer 14, intended to form another portion of the visible face of the lining element, as this will now be described.

The additional layer 14 may be of any nature suitable for being sewn with the complex 4. The additional layer 14 is also able to be shaped, like the complex 4, and to be sewn without being degraded. The additional layer 14 is for example a layer of leather or leather substitute, of textile material, of plastic material such as a layer of polyethylene terephthalate (PET), or of another material, or a superposition of layers formed with one or more of the materials indicated above. The front face of the additional layer 14 substantially extends in the continuity of the front face of the complex 4, i.e. the complex 4 and the additional layer 14 are assembled together so as to form a substantially continuous surface outside the junction area between the complex 4 and the additional layer 14.

A portion of the periphery 10 of the complex 4 is assembled to a portion of the periphery 12 of the additional layer 14 by at least one seam 16, crossing the whole thickness of the complex 4 and of the additional layer 14. The yarn used for producing the seam 16 may be any suitable yarn for ensuring robust attachment between the complex 4 and the additional layer 14. The seam 16 is also laid out so as to ensure the seal between the complex 4 and the additional layer 14, i.e. for preventing the passage of any material between the peripheries 10 and 12 of these layers from the backside to the front side or from the front side to the backside of the decorative layer 1.

Figure 2:
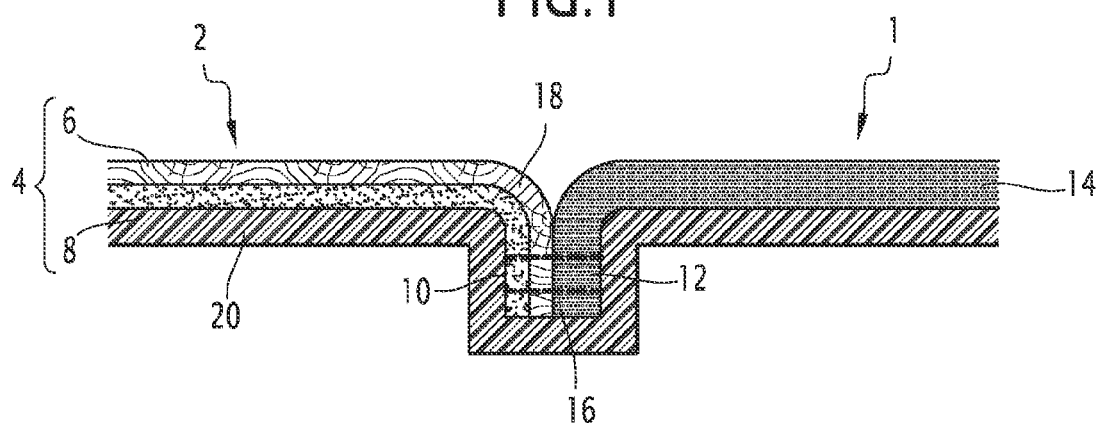
FIG. 2 is a schematic sectional illustration of a portion of a lining element according to an embodiment of the invention.

According to an embodiment, illustrated in FIGS. 1 and 2, the seam 16 is completely invisible from the outside of the lining element 2. To do this, the portions of peripheries 10 and 12 intended to be sewn together are folded on the backside of the decorative layer 1 relatively to the remainder of the complex 4 and of the additional layer 14, so as to form two edges extending, one facing the other, on the backside of the decorative layer 1. Both of these edges are sewn together with a seam 16 substantially extending parallel to the decorative layer 1, as illustrated in FIGS. 1 and 2. According to an embodiment not shown, the complex 4 and the folded-back portion of its periphery 10 form between them a fold 18, the radius of curvature of which is greater than or equal to 4 mm, which provides a clean and clear transition between the ligneous material layer 6 and the additional layer 14 when the latter are sewn together, so that the aspect of the lining element 2 is improved.

Figure 3:
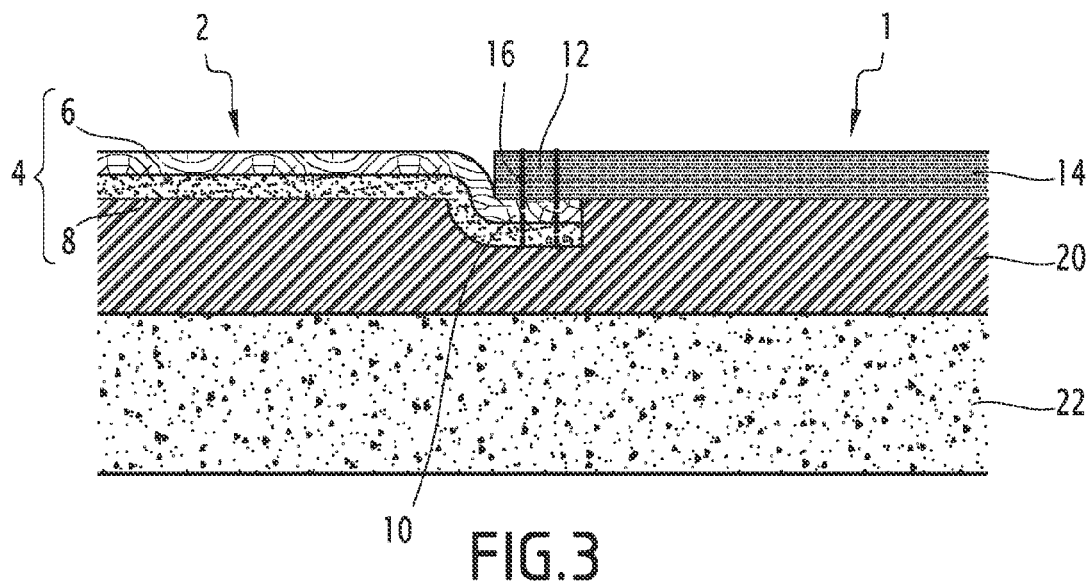
FIG. 3 is a schematic sectional illustration of a portion of a lining element according to another embodiment of the invention.

According to another embodiment illustrated in FIG. 3, the seam 16 is visible from the outside of the lining element and forms a visible seam giving a particular aspect to the lining element 2. In this case, the portion of the periphery 10 of the complex 4, respectively of the additional layer 14, is laid out for passing under the portion of the periphery 12 of the additional layer 14, respectively of the complex 4 and these portions are sewn together with a seam 16 extending substantially perpendicular to the decorative layer 1, as illustrated in FIG. 3.

Preferably, the seam 16 extends over the whole junction area between the complex 4 and the additional layer 14.

Of course sewing the complex 4 and/or the additional layer 14 to further at least one other additional layer or another complex may be contemplated so as to form a decorative layer 1 having the intended aspect, shape and dimensions.

The additional layer 14 may advantageously be used for forming functional areas, which would be more expensive to make in the ligneous material layer 6. Thus, the additional layer 14 may comprise an area for attaching the decorative layer 1 in a tool for manufacturing the lining element. This attachment area is for example formed with lugs allowing the decorative layer 1 to be hooked up in the manufacturing tool and then removed or hidden, when the lining element 1 is finished. These lugs may be made in an area of the additional layer away from the junction area with the complex 4, which reduces the risks of damaging the decorative layer 2 in the area of interest of the latter, i.e. in a visible area, during optional finishing operations, such as the removal of the attachment lugs. The manufacturing costs of the lining element are also reduced by reducing the amount of ligneous material to the strict amount required in order to make the complex 4 forming a portion of the visible face of the lining element, without requiring additional areas intended to be removed or hidden in the finished lining element.

The decorative layer 1 described above may form a lining element by itself by being directly applied on a structure to be lined.

According to the embodiment illustrated in FIGS. 2 and 3, the lining element 2 however further comprises at least one supporting layer 20 extending on the backside of all or part of the decorative layer 1. The supporting layer 20 is for example substantially rigid and gives the possibility of preserving the shape of the decorative layer 1 and of stiffening the lining element 2.

The supporting layer 20 coats the junction area between the complex 4 and the additional layer 14, as illustrated in FIGS. 2 and 3, and notably coats the seam 16. Such a coating gives the possibility of further improving the seal of the junction area, the supporting layer 20 forming a barrier on the backside of the junction area.

The supporting layer 20 is for example made in a composite material comprising natural fibers embedded in a plastic material. Such a composite material is known under the name of NFC (Natural Fiber Composite or composite in natural fibers). Natural fibers are for example formed by wood or flax fibers or of another material. Plastic material fibers are for example polypropylene (PP) and/or polyethylene terephthalate (PET) fibers and are melted while coating the natural fibers in order to form a cohesive assembly, in which the natural fibers are bound together by the plastic material.

The supporting layer 20 for example has a thickness substantially equal to 2 mm. This thickness is not necessarily constant and may for example be reduced in the coating area of the junction between the complex 4 and the additional layer 14 in order to form a lining element of constant thickness. According to an alternative not shown, the seam 16 may be laid out for also sewing the supporting layer 20 with the complex 4 and the additional layer 14, in particular when the supporting layer 20 has a density of less than 1.

The supporting layer 20 is attached to the decorative layer 1 in a known way, for example by overmolding of the supporting layer 20 on the backside of the decorative layer 1 or by compressive assembly between the supporting layer 20 and the decorative layer 1.

According to an embodiment illustrated in FIG. 3, the lining element 2 may further comprise, in addition to the supporting layer 20 or instead of the latter, a foam layer 22 extending on the backside of the supporting layer 20 or of the decorative layer 1. Such a foam layer is standard in this type of application. It may be made by foaming a foam-precursor material on the backside of the supporting layer 20, which is then used as a sealing layer preventing the foam from passing to the front side of the decorative layer 1 or onto the backside of the decorative layer 1, when the seam 16 is sufficient for ensuring the seal of the junction area between the complex 4 and the additional layer 14.

The lining element 1 described above has a particular aspect, giving the possibility of imparting "high end" aesthetics to the structure which is lined with the lining element 1 which is inexpensive, less polluting and simple to produce. It may have reduced thickness and mass as compared with the lining elements of the prior art.

The invention claimed is:

1. A lining element comprising at least one decorative layer formed from at least one complex comprising both a ligneous material layer having a backside and a front side, and a reinforcement layer, extending over the backside of the ligneous material layer, the complex comprising a front side formed by the front side of the ligneous material and a backside formed by the backside of the reinforcement layer,
wherein the decorative layer further comprises at least one additional layer made in a material different from the ligneous material and having a front side and a backside, said front side of the additional layer and said front side of the complex forming a substantially continuous surface of the decorative layer, said additional layer and said complex being sewn to each other by at least one seam,
wherein the seam extends through the complex including the ligneous material layer and the reinforcement layer,
wherein the seam extends through a thickness of the decorative layer, and
wherein a cross-section of the seam begins at the backside of the complex and ends at the backside of the additional layer, or begins at the backside of the complex and ends at the front side of the additional layer.

2. The lining element according to claim 1, wherein the seam crosses the complex including the ligneous material layer and the reinforcement layer.

3. The lining element according to claim 1, wherein the seam extends substantially parallel to the decorative layer or substantially perpendicular to the decorative layer.

4. The lining element according to claim 1, further comprising at least one supporting layer extending over the backside of the decorative layer.

5. The lining element according to claim 4, wherein the seam attaching the additional layer and the complex extends on the backside of the decorative layer and is coated with the supporting layer.

6. The lining element according to claim 4, wherein the supporting layer is formed by a composite material comprising natural fibers embedded in a plastic material.

7. The lining element according to claim 4, further comprising a foam layer extending over a backside of the supporting layer such that the supporting layer is located between the foam layer and the decorative layer.

8. The lining element according to claim 1, further comprising a foam layer extending on the backside of the decorative layer.

9. The lining element according to claim 1, wherein the additional layer comprises an area for attachment of the decorative layer in a tool for manufacturing the lining element, said attachment area being positioned at a distance from the complex.

10. The lining element according to claim 1, wherein the additional layer is made of leather or of a leather substitute, a textile material, a plastic material or is a complex of different layers of such materials.

* * * * *